United States Patent
Burgdorf et al.

(10) Patent No.: US 6,398,317 B1
(45) Date of Patent: Jun. 4, 2002

(54) HYDRAULIC VEHICLE BRAKE SYSTEM WITH WHEEL SLIP CONTROL, AND VALVE FOR SUCH A BRAKE SYSTEM

(75) Inventors: Jochen Burgdorf, Offenbach; Peter Volz, Darmstadt, both of (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/424,214

(22) PCT Filed: May 18, 1998

(86) PCT No.: PCT/EP98/02906

§ 371 Date: Mar. 10, 2000

(87) PCT Pub. No.: WO98/52801

PCT Pub. Date: Nov. 26, 1998

(30) Foreign Application Priority Data

May 24, 1997 (DE) .......................................... 197 21 774

(51) Int. Cl.[7] .......................... B60T 8/34; F16K 17/04; F16K 17/164; F16K 17/14
(52) U.S. Cl. ..................... 303/116.2; 303/901; 137/71
(58) Field of Search .......................... 303/116.1, 116.2, 303/900, 901; 137/67, 68.11, 71

(56) References Cited

U.S. PATENT DOCUMENTS

| | | | | |
|---|---|---|---|---|
| 1,571,022 A | * | 1/1926 | Obert .......................... | 23/298 |
| 3,797,805 A | * | 3/1974 | Nielsen ....................... | 137/67 |
| 3,904,111 A | * | 9/1975 | Petersson .................... | 137/67 |
| 4,267,853 A | * | 5/1981 | Yamaguchi et al. .......... | 137/67 |
| 4,607,664 A | * | 8/1986 | Carney et al. ............... | 137/67 |
| 4,651,763 A | * | 3/1987 | Scobie et al. ................ | 137/67 |
| 4,739,799 A | * | 4/1988 | Carney et al. ............... | 137/67 |
| 5,271,667 A | * | 12/1993 | Takata et al. ............ | 303/116.1 |
| 5,299,598 A | | 4/1994 | Quaranta et al. | |
| 5,365,963 A | * | 11/1994 | Hoffmann .................... | 137/67 |
| 5,505,529 A | | 4/1996 | Siegel | |
| 5,605,384 A | | 2/1997 | Johnston et al. | |
| 5,666,991 A | * | 9/1997 | Hartig ......................... | 137/67 |
| 5,771,916 A | * | 6/1998 | Armenia et al. .............. | 137/67 |
| 6,199,961 B1 | * | 3/2001 | Beck ....................... | 303/116.1 |
| 6,209,969 B1 | * | 4/2001 | Aumuller et al. ........ | 303/116.1 |
| 6,244,295 B1 | * | 6/2001 | Bartussek et al. .......... | 137/540 |

FOREIGN PATENT DOCUMENTS

| | | | |
|---|---|---|---|
| DE | 1931984 | | 4/1971 |
| DE | 3532933 | | 3/1987 |
| DE | 4329900 A1 | * | 3/1995 |
| DE | 433967 | | 5/1995 |
| DE | 43 37 133 | | 5/1995 |
| DE | 19632158 A1 | * | 8/1996 |
| DE | 19632242 | | 5/1997 |
| DE | 196 32 343 | | 5/1997 |
| DE | 19632158 | | 2/1998 |
| WO | 97/18977 | * | 11/1996 |

* cited by examiner

*Primary Examiner*—Joseph D. Pape
*Assistant Examiner*—Hilary Gutman
(74) *Attorney, Agent, or Firm*—Rader, Fishman & Grauer PLLC

(57) ABSTRACT

The present invention relates to an automotive vehicle brake system with wheel slip control which is provided with a non-return valve, between a secondary and a primary circuit. Initially, both circuits are evacuated for filling the brake system with pressure fluid, and evacuation of the secondary circuit is effected by way of the valve that opens. The present invention teaches providing this valve with an additional device by way of which the opening pressure of the valve is automatically increased after filling the brake system with brake fluid. The opening pressure shall be increased at least to such an extent that the valve closure member remains in the closing position at least during normal operation of the brake system. It is achieved by this provision that the secondary circuit can be sufficiently evacuated for the purpose of being filled with brake fluid, without a vacuum being generated later in the secondary circuit during a braking operation.

4 Claims, 4 Drawing Sheets

HYDRAULIC VEHICLE BRAKE SYSTEM WITH WHEEL SLIP CONTROL, AND VALVE FOR SUCH A BRAKE SYSTEM

TECHNICAL FIELD

The present invention generally relates to brake systems and more particularly relates to a hydraulic automotive vehicle brake system with wheel slip control.

BACKGROUND OF THE INVENTION

A generic hydraulic brake system with a primary circuit and a secondary circuit is described in German patent application No. 43 37 133. The term 'primary circuit' refers to the connecting lines and channels which connect the master brake cylinder of the brake system to the wheel brakes and through which brake fluid is conducted in the direction of the wheel brakes during normal braking operations. The term 'secondary circuit' refers to those connecting lines and channels which are penetrated by pressure media in the case of wheel slip control.

The secondary circuit is connected to the primary circuit by way of an outlet valve on the inlet side and by way of a so-called return pump on the outlet side. The brake system is filled with a conventional brake fluid as a pressure medium. Filling is effected at the end of the vehicle assembly on the assembly line after the brake system has been installed into the vehicle in dry condition. The following procedure has proved to be quick and unproblematic to carry out. Initially, the entire system is evacuated and, in the evacuated condition, is thereafter connected to a brake fluid reservoir. The result is that brake fluid enters into the brake system and first fills the primary circuit. In order that the secondary circuit is also filled with pressure fluid, the electromagnetically operable outlet valve is opened during this process, i.e., both during evacuation and filling. This is disadvantageous inasmuch as provision must be made at the filling station to switch the normally closed outlet valve to adopt its open position.

Therefore, it has been suggested in German patent application No. 4337133 to interpose a non-return valve, which opens towards the primary circuit, between the secondary circuit and the primary circuit. This valve will open during evacuation of the system so that both circuits are evacuated. Because the valve closure member is not acted upon by a spring in the closing direction, as is disclosed in the first embodiment of the above publication, the valve remains open at the end of the evacuation process so that both the primary circuit and the secondary circuit are filled with pressure fluid during the filling process. In a second embodiment, it is emphasized as favorable that the non-return valve closes after the evacuation process. According to the application, this is said to be achieved because the valve closure member is arranged above the valve seat and urged against the valve seat by the force of gravity. In a wheel slip control operation which is induced on a roller test bench, where the outlet valve is open and the return pump is switched on, brake fluid flows into the secondary circuit.

A metal/metal seal pairing for the valve seat and the valve closure member is inappropriate because contaminants or chips may gather between the valve seat and the valve closure member and prevent complete closure of the valve. In this respect, an older application (German serial No. 19632343.6 dated Feb. 10, 1996) disclosed making at least the sealing lip of the valve closure member of a relatively soft plastic material which receives and stores the contaminants contained in the brake fluid so that reliable closure of the non-return valve is ensured. Further, it has been disclosed to load the valve closure member with a weak spring so that both circuits are evacuated during the evacuation process, similar to the second suggestion made in German patent application No. 43 37 133. Initially, only the primary circuit is filled with brake fluid during the filling process, while the secondary circuit is filled by opening the outlet valve in an induced wheel slip control operation. However, this solution, too, involves problems, especially in those cases where the secondary circuit is constituted by a channel in a so-called valve block made of steel or aluminum. Upon brake application, where pressure develops in the primary circuit, the pressure is applied to the valve closure member which, by compression of its elastically yielding sealing lip, is displaced in the direction of the secondary circuit. The volume decreases which is provided for the pressure fluid in the secondary circuit, with the result that a corresponding part of the brake fluid is displaced past the sealing lip into the primary circuit. After release of the brakes, that is, after the pressure in the primary circuit has been reduced again, the valve closure member is shifted back again, under the elastic effect of its sealing lip. The space in the secondary circuit which is available for the pressure fluid will increase, with the result that a vacuum develops therein which is not desirable. One possibility of overcoming the problem would be to increase the bias of the valve spring, which, in turn, would prevent a complete evacuation of the secondary circuit. This would necessitate a special filling process.

In another older application German patent application 196 321 58, it was suggested inserting a closure member instead of a non-return valve into the evacuation connection between primary and secondary circuits, which is made of a swellable synthetic caoutchouc and has no spring. After evacuation and filling of the brake system, the purpose of the closure member is to get swollen and interrupt the evacuation connection this way. However, the proposed solution to the above-mentioned problems involves a certain safety risk. The risk is that the swollen closure member which is durably elastic to a certain degree is directly exposed to the primary circuit and the secondary circuit and is thereby constantly subjected to deforming forces which are caused by the pressure differences between primary and secondary circuits that occur rapidly and alternatingly in the operation of the brake system. Boosted by high temperatures, the arising deformation forces can cause a viscous flow behavior of the closure member and, hence, malfunctions of the entire brake system due to leakage.

Thus, an object of the present invention is to configure a valve so that it is appropriate to eliminate the above-mentioned problems when used in the automotive vehicle brake system with wheel slip control described hereinabove.

To this end, the present invention suggests the provision of an additional device which, after filling of the brake system with brake fluid, permits automatically increasing the pilot pressure, which must be overcome for opening the spring-applied valve closure member, at least to such an extent that the valve closure member remains in the closing position at least during normal operation of the brake system.

A major advantage of the valve of the present invention is that a weak valve spring can be chosen for the purpose of evacuation of the brake system, and also the secondary circuit can reliably be evacuated this way. A 'dry' opening pressure for a reliable evacuation may e.g. amount to 50 millibar approximately. Because the additional device makes the opening pressure for the spring-applied closure member rise automatically after filling of the brake system with brake fluid, vacuum deposits or vacuums in the secondary circuit are prevented. However, the original spring application of the valve still exists so that at least the initial opening pressure and, thus, an unlimited operability of the brake system is ensured even if a malfunction or failure of the additional device occurs.

DETAILED DESCRIPTION OF THE PREFERRED EMBODIMENTS

Figure 1:
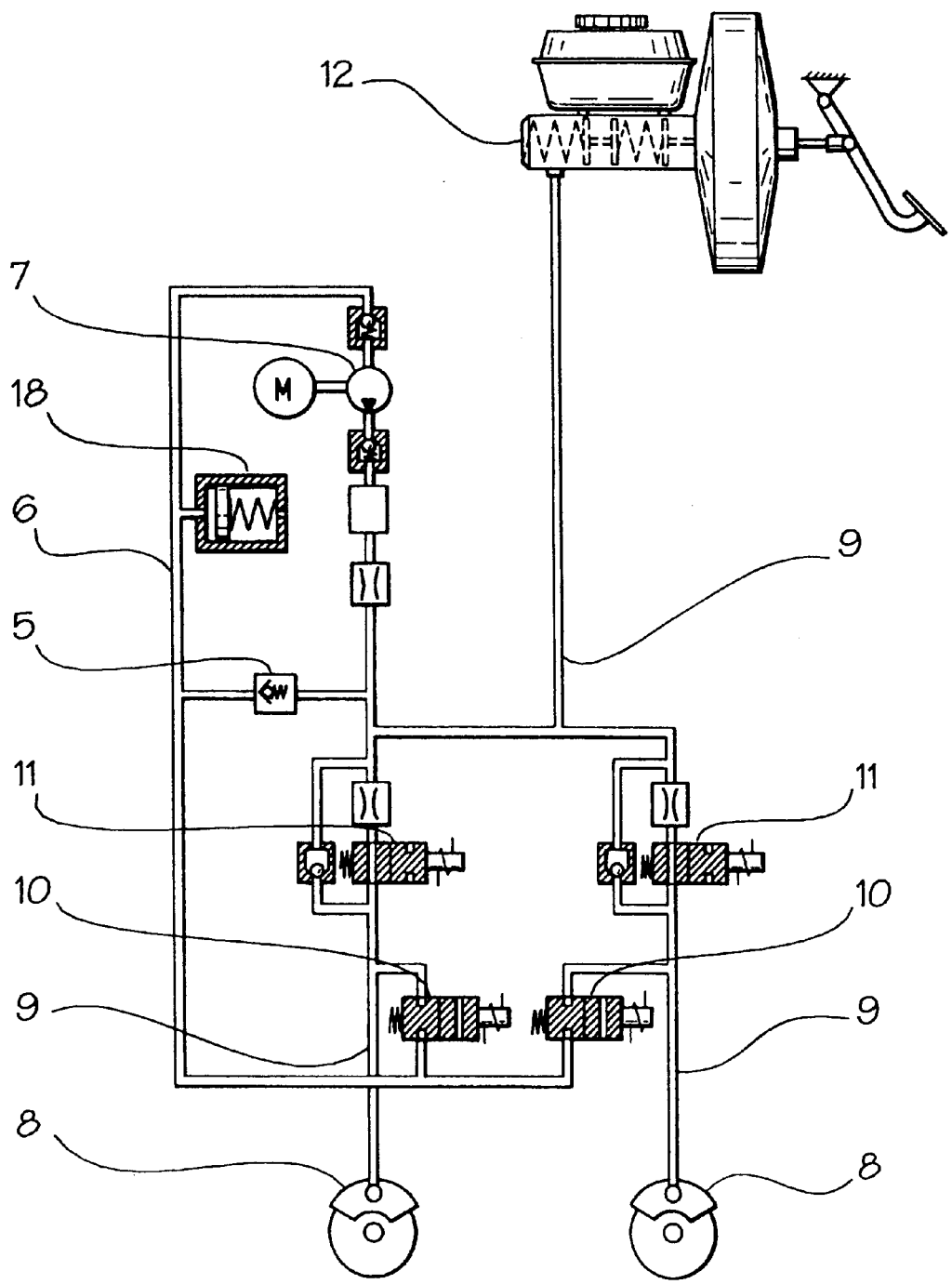
FIG. 1 is a hydraulic circuit arrangement for an automotive vehicle brake system with wheel slip control with a diagrammatic representation of the valve of the present invention.

FIG. 1 shows the hydraulic circuit diagram for a hydraulic automotive vehicle brake system with wheel slip control which operates according to the recirculation principle.

A braking pressure conduit 9 connected to a braking pressure generator 12 is branched to lead to two wheel brakes 8, and open inlet valves 11 which are not energized electromagnetically in the initial position but are inserted into the branch lines of the braking pressure conduit 9. This hydraulic portion of the brake system shall be referred to by the term "primary circuit" in the following. Outlet valves 10 which are closed in their initial position are arranged in the braking pressure conduits 9 between the inlet valves 11, open in their initial position, and the wheel brakes 8. The valves 10 are in connection to a suction conduit 6 of a pump 7. Succeeding the suction conduit 6 is a bypass line which is connected to the braking pressure conduit 9 and accommodate a valve 5 that will be explained in detail hereinbelow. The valve closure member 1 of the valve configured as a non-return valve 5 is acted upon by a valve spring 4 in the closing direction so that the non-return valve 5 permits a hydraulic connection exclusively from the suction conduit 6 to the braking pressure conduit 9. Interposed between the connection on the non-return valve 5 to the suction conduit 6 and the pump 7 in the bypass line is a low-pressure accumulator 18. The hydraulic portion which extends from the outlet valves 10, closed in the initial position, to the pump 7 is described by the term "secondary circuit" in the following. The pump 7 includes a schematically exhibited suction valve and a pressure valve and is connected to the braking pressure conduit 9 by way of a noise-damping device connected downstream.

Constructive details of the non-return valve 5, which is represented in the hydraulic circuit arrangement, can be taken from three embodiments illustrated in FIGS. 2a–2c, 3a–3c and 4a–4c. Initially, all embodiments are represented in the dry and pressure-balanced condition (FIG. Xa), then in the open condition during evacuation (FIG. Xb) and finally, after filling with brake fluid, i.e., in the ready-for-use condition of the brake system (FIG. Xc).

Figure 2C:
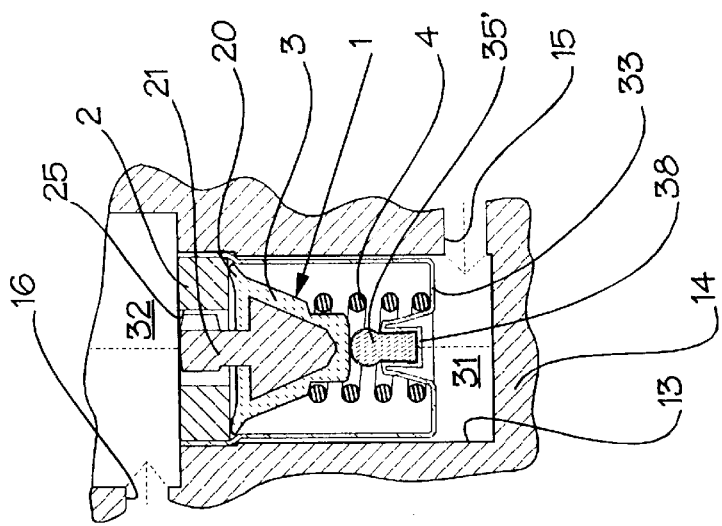
FIG. 2c is an embodiment of the valve of the present invention after filling.
Figure 2B:
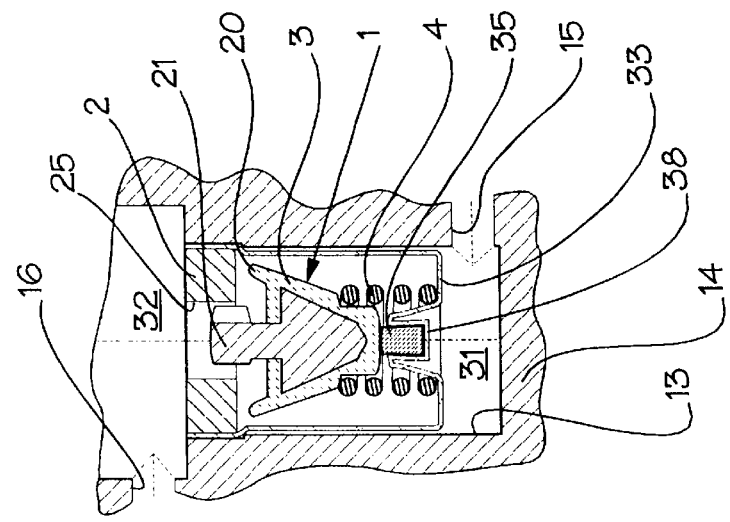
FIG. 2b is an embodiment of the valve of the present invention during the evacuation.
Figure 2A:
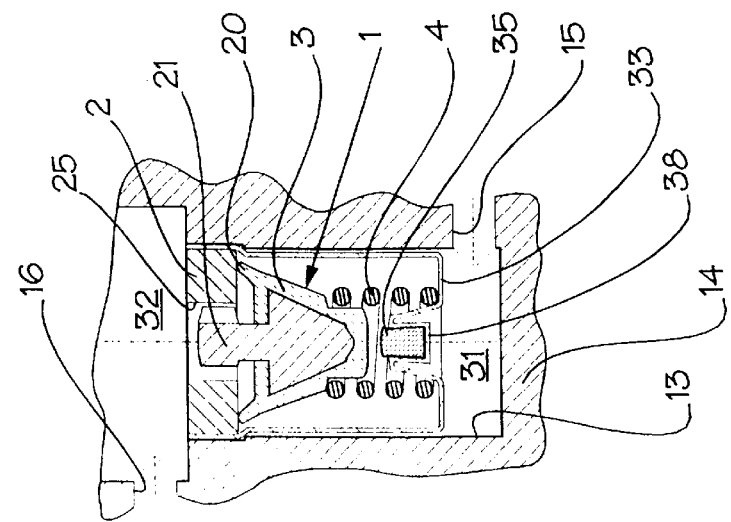
FIG. 2a is an embodiment of the valve of the present invention prior to the evacuation.

The embodiment illustrated in FIGS. 2a, 2b, 2c respectively shows that the valve 5 in the previously explained operating conditions. The actual valve is accommodated in a blind-end bore 13 of an accommodating member 14 which can be configured in a cartridge-type construction and as an insert member that is separately fitted in a valve block. However, valve 5 may also be inserted directly into the accommodating member of one of the outlet valves 10. Valve 5 includes a valve closure member one which, in turn, comprises an elastomeric sealing member 3 and a guide member 21, which is preferably made of metal. The guide member 21 projects with its one end into a valve passage 25 provided in a valve seat member 2. Its other end is encompassed by the elastomeric sealing member 3. As its proper sealing element, the elastomeric sealing member 3 has a circumferential bead or a lip 20. Under the effect of spring 4, the bowl-shaped elastomeric sealing member 3 with its bead 20 bears against a disc-shaped sealing surface of the valve seat member 2. Valve seat member 2 is caulked into a previous bowl-shaped mounting sleeve 33 and shuts off the latter towards the top so that the valve closure member 1 is always maintained in the closing position by the spring 4 that is supported on the bottom of the mounting sleeve 33 in the pressure-balanced and dry delivery condition. In the bottom area of the mounting sleeve 33, an accommodating chamber 38 is formed for the swelling body 35 made from any swelling material. additional device 35 made from any swelling body material.

The construction unit comprising the mounting sleeve 33, the valve seat member 2, the valve closure member 1, valve spring 4 and swelling body 35 made be readily assembled at a different location, for example, and delivered for insulation into a brake. For this purpose, the construction unit is inserted completely into the stepped blind-end bore 13 of the accommodating member 14 and caulked at a top, enlarged area.

Above the valve seat member 2, the accommodating member 14 has a hollow space or a chamber 32 into which a transverse bore 16 extends which connects the valve 5 to the secondary circuit. Below the mounting sleeve 33, a chamber 31 is arranged similarly into which a transverse channel 15 opens that leads to the primary circuit.

The secondary circuit which is separated by way of electrically and hydraulically operable valves which are closed in their deenergized condition in the delivery condition of the brake system is hence to be considered as an isolated area in the hydraulic system when valve 5 is closed.

In the evacuation process illustrated in FIG. 2b, a vacuum is generated in the bottom chamber 31 which is directly connected to the primary circuit. He a the vacuum causes the valve closure member 1 to move from the valve seat member 2 so that vacuum develops also in the top chamber 32 which is connected to the secondary circuit. To permit movement of the valve closure member 1, the opening pressure produced by the valve spring 4 must first be overcome. Hence, a week spring rate should be chosen for a complete evacuation of the secondary circuit. As soon as approximately equal vacuum conditions are established in the primary and secondary circuits under this precondition, the valve 5 will closed automatically so that initially only the primary circuit is connected during filling of the brake system.

The vacuum in the primary circuit is displaced by the inflowing brake fluid so that the closure member 1, which in the beginning is pressed only slightly against the valve seat member 2 due to the weak spring, is pressed into closer contact with the valve seat member due to the resulting pressure difference between the primary and secondary circuits, by spreading the sealing lip 20 (FIG. 2*c*). Simultaneously, the swelling body 35 made of synthetic caoutchouc is wetted by the brake fluid which flows in through the previous mounting sleeve 33 having a finely perforated grid, for example, and is thereby expanded in volume. After termination of the swelling action, the closure member 1 is closed tightly by the swelling body 35 and reliably supported by the swelling body 35', expanded in volume, as can be seen in FIG. 2*c*.

The arrangement, size and material of the swelling body can be conformed to one another so that the opening pressure of the valve 5 is so greatly increased after the swelling action that this way a permanent closing function of the valve 5 can be achieved.

Different from the above-mentioned solution disclosed in German patent application (German official serial No. 19632158.1.6 dated Aug. 9, 1996), the respective pressures of the primary circuit are only applied to the surface of the swelling body so that damage due to deformation is prevented. If, due to aging or similar effects, damages to the swelling body should occur nevertheless, the existing valve spring 4 will ensure at least a limited sealing between primary and secondary circuits.

To avoid repetitions, only the differences with respect to the embodiment already described hereinabove will be referred to in the following two embodiments illustrated in FIGS. 3*a* to 3*c* and, respectively, 4*a* to 4*c*. The above description relating to FIGS. 2*a* to 2*c* will be referred to in all other respects.

Figure 3C:
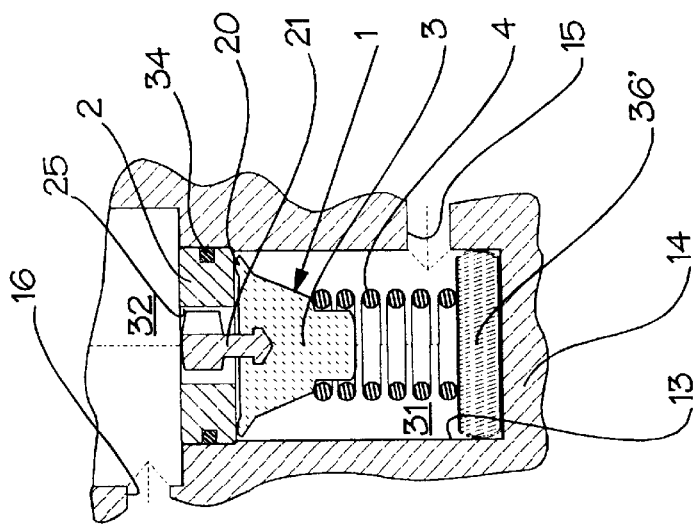
FIG. 3c is a second embodiment of the valve of the present invention after filling.
Figure 3B:
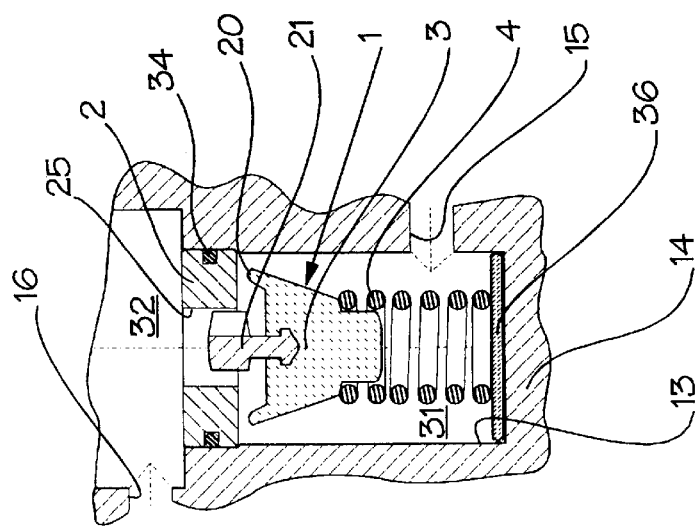
FIG. 3b is a second embodiment of the valve of the present invention during the evacuation.
Figure 3A:
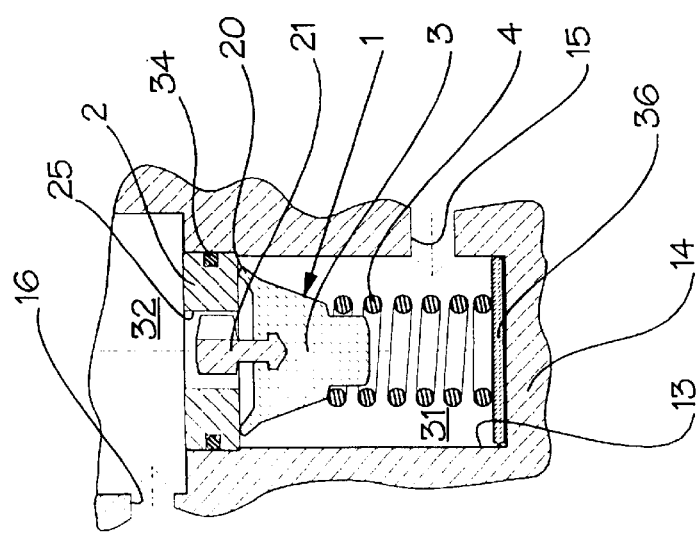
FIG. 3a is a second embodiment of the valve of the present invention prior to the evacuation.

A mounting sleeve was omitted in the valve 5 shown in FIGS. 3*a* to 3*c*. Instead, the additional device 36, 36' (which again includes a swelling body element), the valve spring 4 and the closure member 1 are inserted directly into the blind-end bore 13 and clamped and fixed by means of the valve seat member 2. A sealing ring 34 which extends inside an annular groove is used as an additional sealant. The difference in terms of function over the previous embodiment is, however, that the valve spring with its one end is supported on the swelling body element 36. After the swelling body 36' has increased in volume, the function of the valve spring 4, instead of its superposition or elimination, is only modified this way. As can be seen in FIG. 3*c*, the increase in volume of the swelling body element 36' involves a shortened spring travel, with the result of a simultaneous increase of the bias of valve spring 4. The ratio between the valve opening pressure in the dry condition and the valve opening pressure in the operating condition of the brake system can be determined very precisely with the illustrated type of valve construction.

Figure 4C:
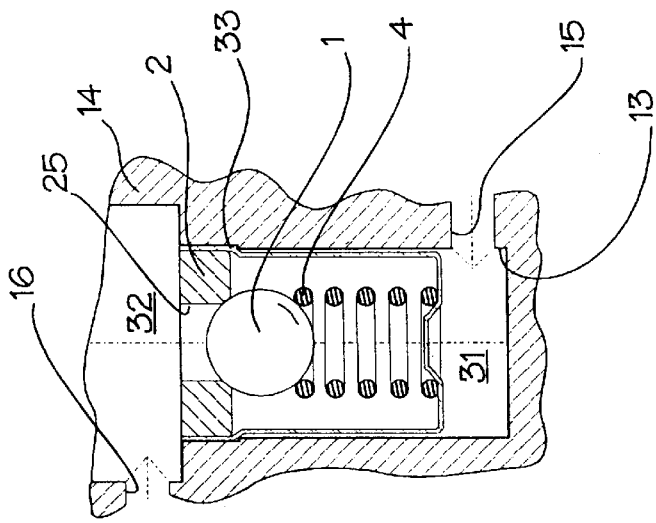
FIG. 4c is a third embodiment of the valve of the present invention after filling.
Figure 4B:
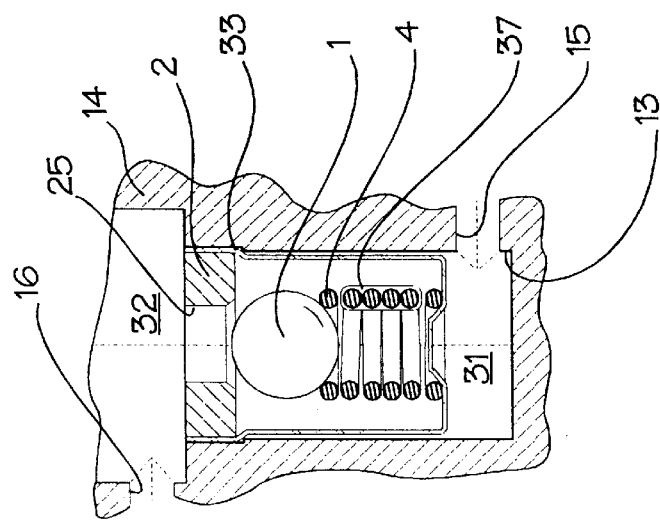
FIG. 4b is a third embodiment of the valve of the present invention during the evacuation.
Figure 4A:
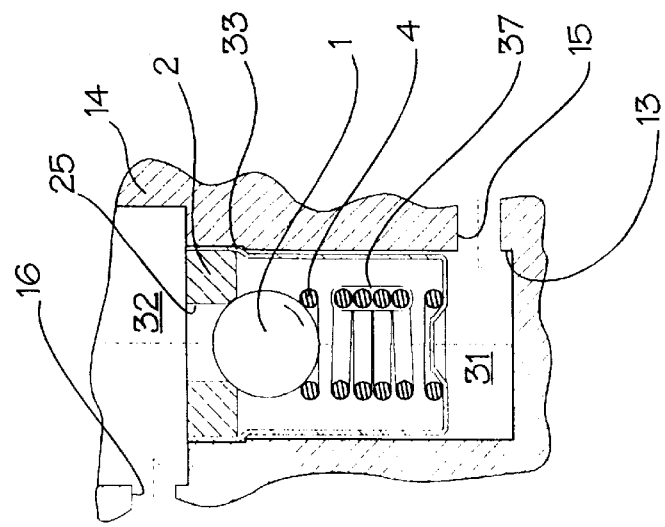
FIG. 4a is a third embodiment of the valve of the present invention prior to the evacuation.

Although the present invention adds to the prior art sealing lip closure members in the described and especially favorable fashion, this is not meant as a limitation so that the last embodiment shown in FIGS. 4*a* to 4*c* relates to a conventional spherical seat valve. In contrast to the swelling bodies referred to hereinabove, a captivating element 37 shown is composed of a material which dissolves under the influence of brake fluid and is configured as a captivating element 37 which e.g. squeezes together four coils of the valve spring 4 lying on top of one another. The captivation is dissolved during filling of the chamber 31 with brake fluid and this way releases the total bias of the valve spring 4. Instead of the illustrated captivating element 37, of course, locking elements are also possible which are arranged laterally on the mounting sleeve 33 or directly on the accommodating member 14 and are made from a suitable material. The locking elements compress the valve spring 4 and released under the influence of brake fluid or also when a defined vacuum (with simultaneous increase of the opening pressure) is achieved.

What is claimed is:

1. A hydraulic vehicle brake system with wheel slip control, comprising:

a primary and a secondary circuit, a valve interposed between the primary and the secondary circuit said valve including a valve seat member and a valve closure member with a pilot pressure, means for automatically permitting an increase of the pilot pressure of the valve closure member acted upon by a valve spring, wherein the pilot pressure is overcome to switch the valve closure member to an open position, at least to such an extent that the valve closure member remains in a closed position during wheel-slip free operation of the brake system, and further comprising a swelling body, wherein the valve spring engages the swelling body, and wherein the valve closure member, the valve spring and the swelling body are positioned inside a hollow chamber provided by an accommodating member and the valve seat member, wherein the swelling body biases the valve closure member against the valve seat member after the hollow chamber is filled with a brake fluid.

2. A hydraulic vehicle brake system with wheel slip control, comprising:

a primary and a secondary circuit, a valve interposed between the primary and the secondary circuit said valve including a valve seat member and a valve closure member with a pilot pressure, means for automatically permitting an increase of the pilot pressure of the valve closure member acted upon by a valve spring, wherein the pilot pressure is overcome to switch the valve closure member to an open position, at least to such an extent that the valve closure member remains in a closed position during wheel-slip free operation of the brake system, and a captivating element which encompasses at least two adjacent coils of the valve spring.

3. A hydraulic vehicle brake system with wheel slip control, comprising:

a primary and a secondary circuit, a valve interposed between the primary and the secondary circuit said valve including a valve seat member and a valve closure member with a pilot pressure, means for automatically permitting an increase of the pilot pressure of the valve closure member acted upon by a valve spring, wherein the pilot pressure is overcome to switch the valve closure member to an open position, at least to such an extent that the valve closure member remains in a closed position during wheel-slip free operation of the brake system, wherein the means for automatically permitting the increase of the pilot pressure, the valve closure member, and the valve spring are accommodated in a previous mounting sleeve which is arranged in an accommodating member and is covered by the valve seat member.

4. A hydraulic vehicle brake system with wheel slip control, comprising:
  a valve closure member with a pilot pressure;
  a valve spring; and
  a means for automatically permitting an increase in the pilot pressure,
  wherein the valve closure member, the valve spring, and the means for automatically permitting the increase in the pilot pressure are accommodated in a previous mounting sleeve which is arranged in an accommodating member and is covered by a valve seat member.

* * * * *